United States Patent
Fernandez et al.

[11] Patent Number: 5,905,358
[45] Date of Patent: May 18, 1999

[54] METHOD FOR DISTINGUISHING A STANDARD BATTERY FROM AN ULTRAFAST BATTERY AND CHARGING SAME

[75] Inventors: Jose Maria Fernandez, Sunrise; Ronald Scot Coapstick, Plantation, both of Fla.

[73] Assignee: Motorola, Inc., Schaumburg, Ill.

[21] Appl. No.: 08/957,479

[22] Filed: Oct. 24, 1997

[51] Int. Cl.$^6$ .......................... H01M 10/44; H01M 10/46
[52] U.S. Cl. ............................................. 320/106; 320/125
[58] Field of Search ..................................... 320/106, 107, 320/110, 125, 132, 150, 154, 160, FOR 105, FOR 119, FOR 120, FOR 121, FOR 134, FOR 142, DIG. 21

[56] References Cited

U.S. PATENT DOCUMENTS 5,057,761  10/1991  Felegyhazi, Sr. ........................ 320/110
5,471,128  11/1995  Patino et al. .
5,576,612  11/1996  Garrett et al. .

*Primary Examiner*—Edward H. Tso
*Attorney, Agent, or Firm*—Scott M. Garrett

[57] ABSTRACT

In a charging system having a battery (104) with a high rate protection switch (120), and a charger (102) having a disable switch (221) that cooperates with a control switch transistor (224) to alternatively enable and disable the high rate protection switch, a method is employed by the charger to determine the presence or absence of the high rate protection circuit and apply an appropriate charge regime. The method includes applying a test current, then measuring the battery voltage while trying to disable the high rate protection circuit. If the voltage is sufficiently higher during such time, compared to normal operation, then the battery is charged at an ultrafast rate.

10 Claims, 3 Drawing Sheets

5,905,358

METHOD FOR DISTINGUISHING A STANDARD BATTERY FROM AN ULTRAFAST BATTERY AND CHARGING SAME

TECHNICAL FIELD

This invention relates in general to batteries and battery charging, and particularly to methods of identifying and charging batteries.

BACKGROUND

Many present day electronic and electrical devices are powered by a rechargeable battery or battery pack. This is particularly true in certain fields, such as portable communications devices including cellular telephones, for example. Rechargeable batteries are preferred in such applications because of the cost advantage over non-rechargeable batteries, since a rechargeable battery can be used and recharged often up to several hundred times.

Unfortunately, it is often the case that the battery used with portable communications device significantly adds to the volume and weight of the device. In many markets for such products, size and weight are key market features, and the emphasis in designing these products is to reduce the battery size. There are several design strategies that are used working towards this goal. Chief among these is to reduce the power requirements of the device, therefore allowing a smaller battery to be used without significantly reducing the operation time afforded by the battery. In certain markets, another strategy is to reduce the charging time of the battery. Typically, the time required to charge a battery is longer than the user of the device can wait for the battery to be recharged. For this reason, users of portable devices have come to expect "all day" operation times from a single battery, or they must purchase and carry an additional battery or batteries. However, an "all day" sized battery is typically larger than preferred, and purchasing additional batteries is likewise a non-optimal solution.

To solve this problem many manufacturers have begun to offer so called turbo or ultrafast charging technology. This is the technology used to recharge a battery in, typically, about 15 to 30 minutes. With such a short charging time, a battery can be recharged during brief inactivity periods when mobility is not essential, such as while driving between business appointments, or during a typical "coffee break". To accomplish recharging in such time, it is necessary to increase the electrical current applied to the battery during recharging. This presents a significant problem to many battery designs.

Often a rechargeable battery is provided with two sets of electrical contacts; one set for providing power to it's associated device, and a second set for receiving electric current from a charger. Additionally, the charger contact set often includes contacts for the charger to electrically connect with sensors in the battery, such as thermal sensors, for example. Since the charger contact set is usually exposed when the battery is mounted on it's associated device to allow coupling to a charger while mounted on the device, there exists the potential for a conductive element to contact both the positive and negative charge contacts. This can happen when, for example, a cellular phone battery is carried in a person's pocket with keys, change, and so on. Shorting the battery in such a scenario can result in injury to the person. To avoid such an event, a simple and cost effective solution is to provide a diode in the charging path of the battery, between the charging contacts and the battery cells inside the battery pack. This diode allows for charging current to pass through the cells, but prevents the cells from discharging through the charging contacts.

This charging diode is problematic in considering ultrafast charging because the high electric current used in this sort of charging causes the diode to heat significantly. This can, at the very least, interfere with charge schemes based on temperature and changes in temperature, and at an extreme, can create hot spots on the battery, or even melt battery components. The now conventional solution to this problem is to replace the charging diode with a transistor switch. This transistor switch is preferably a MOSFET type, and is actuated in response to the charger making electrical contact with the sensors in the battery pack, such as, for example, a thermistor or a code resistor. Two excellent references on the topic are U.S. Pat. No. 5,471,128 to Patino et al., and U.S. Pat. No. 5,576,612 to Garrett et al., both of which describe circuits using MOSFETs to replace charging diodes.

However, the prior art does not address the problem of how to identify a battery endowed with such a high rate protection circuit. Batteries including the high rate protection circuit are significantly more expensive to build, and therefore manufactures charge a premium for them. Often it may be the case that the capacity of the turbo or ultrafast battery including the high rate protection circuit is the same or similar to a standard battery also offered for sale. Obviously the standard battery, protected by a charging diode, should not be charged at an ultrafast rate. Conversely, if a battery designed for ultrafast charging is not charged at an ultrafast rate, the purchaser of the battery has not received any benefit for the premium paid for the battery. Therefore, there is a need for a means and method by which a charger can distinguish an ultrafast rate capable battery from a standard rate battery of equal or similar capacity.

DETAILED DESCRIPTION OF THE PREFERRED EMBODIMENT

Figure 1:
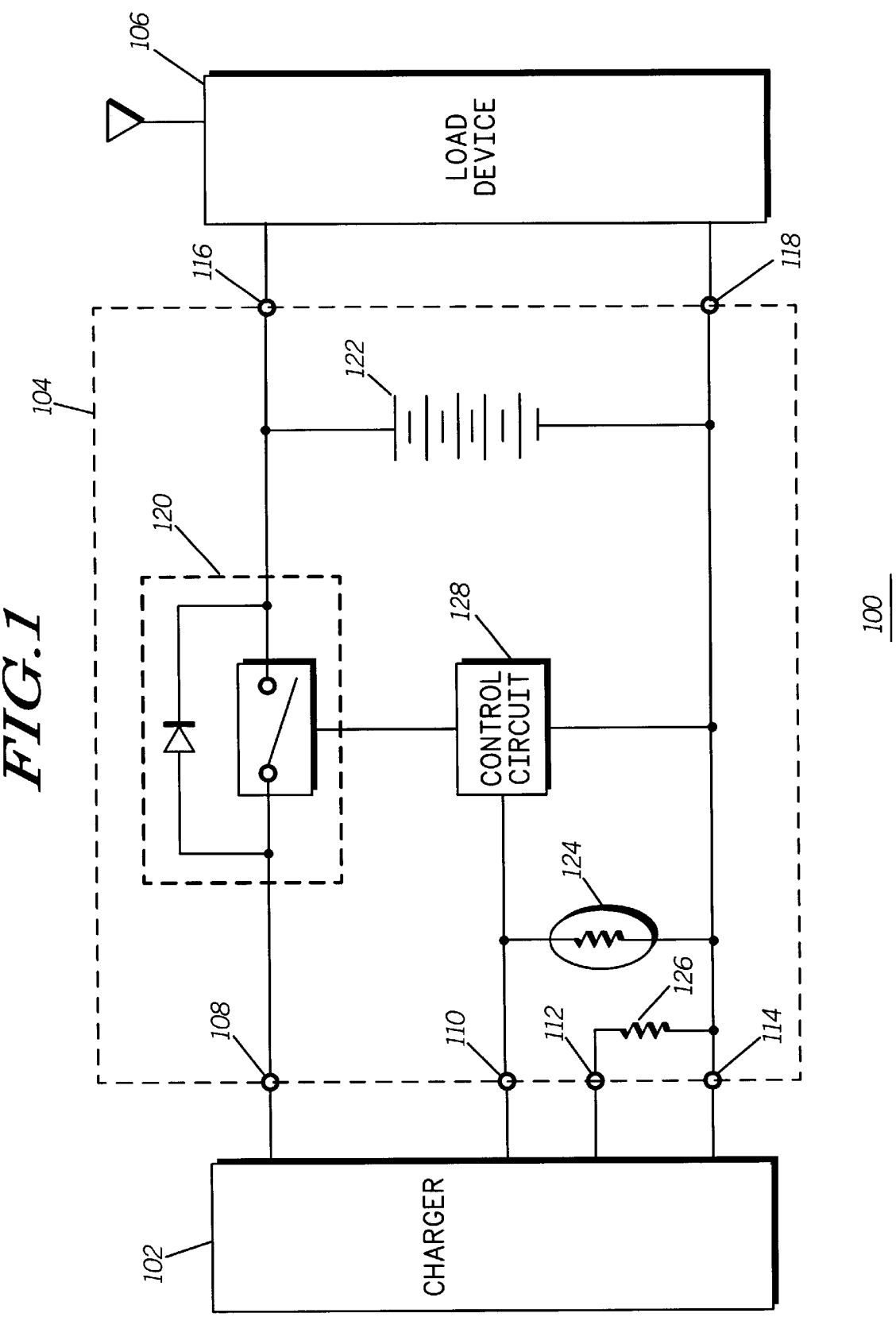
FIG. 1 is a block diagram of a charging system for use in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is shown a charging system 100, including a charger 102, a battery 104, and a device to be powered 106, such as a radio telephone, for example. The battery comprises contacts for connecting to the charger and device, included a positive charger contact 108, thermistor contact 110, code resistor contact 112, negative charger contact 114, positive device contact 116, and a negative device contact 118. The battery further comprises a high rate protection circuit 120, battery cells 122, a thermistor 124, a code resistor 126, and a control circuit 128. The illustrated circuit configuration is one of many that may be used, but is presently the preferred configuration.

The high rate protection circuit 120 acts as a switch, and preferably comprises a Metallic Oxide Semiconductor Field Effect Transistor (MOSFET). When the high rate protection circuit is placed on the positive side of the battery cells, a P-channel MOSFET is preferred, an N-Channel MOSFET when the high rate protection circuit is on the negative side of the battery cells. To provide the necessary short circuit protection between the positive and negative charger contacts, the protection circuit must be in a high impedance, or open, state while not coupled to the charger. When coupled to the charger, the protection circuit must switch to a low impedance, or closed, state to allow the necessary current into the battery cells without heating the protection circuit from resistive power dissipation.

In the preferred embodiment, the protection switch is controlled by the control circuit 128, which is responsive to, for example, the voltage across the thermistor 124. When the battery 104 is coupled to the charger 102, a voltage is applied to the thermistor. The precise voltage depends on the instant resistance value of the thermistor, but in general is enough to cause the control circuit to respond by closing the protection circuit. Upon coupling the battery to the charger, the charger also applies a voltage to the code resistor 126 in a manner known in the art. The code resistor has a different resistance for each type and capacity of battery. For example, a 500 milli-amp hour (mAh) nickel-cadmium battery would have a different coding resistance than a 1000 mAh battery. The differences in resistance between coding resistors of different classes of batteries is used by the charger to select charging parameters such as, for example, charging current and voltage limits. This method of identifying battery classification is well known in the art. However, as mentioned hereinabove, there can exist both a standard battery and an ultrafast battery with the same classification, such as if both are 500 mAh nickel-cadmium batteries, thus both having the same coding resistance.

In order to distinguish between such batteries, a novel method must be employed. The method takes advantage of the fact that upon application of a charging current to the battery, there will be apparent a significant voltage difference across the positive and negative charging contacts, 108 and 114 respectively, between the times when the protection circuit is disabled and enabled. In other words, by observing the battery voltage upon application of a test current and asserting a signal that would disable the protection circuit and comparing the voltage before and after the disabling action is taken by the charger, if a significant change in battery voltage is detected, it is inferred that the protection circuit is present. This because in a standard battery, no protection circuit is present, therefore asserting the signal to disable the protection circuit has no effect. Subsequent to positively determining that the protection circuit is present, the protection circuit is re-enabled and the battery is charged an ultrafast rate. That is, at a rate at which a given battery in a depleted condition would be recharged in about 15–30 minutes.

Figure 2:
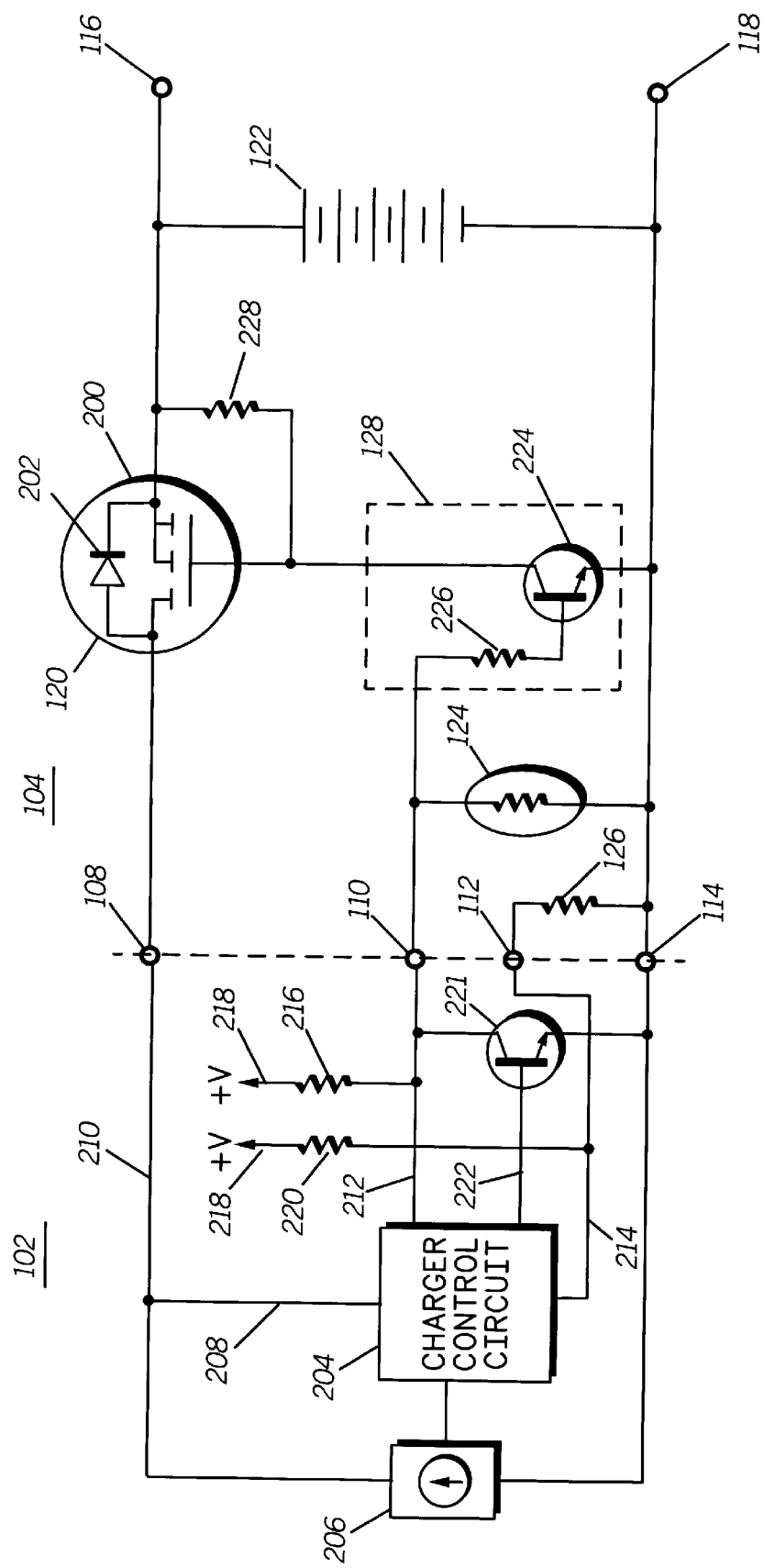
FIG. 2 is a detailed circuit block diagram of a battery and charger for use in accordance with the invention.

The preferred circuit elements in both the battery and the charger for implementing this method are shown in FIG. 2. Referring now to FIG. 2, the preferred charger 102 and battery 104 are shown in more detail. The protection circuit 120 is, in the preferred embodiment, a MOSFET 200. Present manufacturing techniques of MOSFET devices result in the presence of an intrinsic diode 202 connected between the drain and source of the MOSFET. The charger comprises a charger control circuit 204, and a power supply 206, for providing charging current and voltage, responsive to the charger control circuit. The charger control circuit is coupled to the positive charge contact by line 208 to measure the voltage apparent on the positive charge line 210. Any number of well known means may be used to measure the battery voltage, but the preferred method is to use an analog to digital converter so that measurements may be stored digitally for later comparisons by a logic circuit, such as a microprocessor, included in the charger control circuit. Also provided in the charger are a thermistor line 212 and a code resistor line 214. The thermistor line couples the charger control circuit to the thermistor 124 in the battery so that the charger control circuit can measure the voltage across the thermistor. Voltage is applied to the thermistor line through thermistor pull-up resistor 216 from a fixed voltage source 218. This method of measuring battery temperature is conventional and well known in the art.

The charger determines the battery classification in a manner similar to determining the battery temperature; there is provided in the charger a code pull-up resistor 220, through which voltage is applied to the code resistor line 214, producing a voltage across the code resistor 126. Given that the code pull-up resistor is a known value, the voltage on code resistor line 214 depends on the value of the code resistor 126. As such, the charger control circuit measures the voltage on line 214 and infers the value of the code resistor 126, which indicates the battery classification. This method of classifying the battery is also conventional and well practiced in the art.

The charger is further provided with a disable switch 221 coupled to the thermistor line 212, and controlled by the charger control circuit via control line 222. The disable switch allows the charger to adjust or assert the disable signal onto the thermistor line 212. The battery is provided with control circuit 128, as mentioned hereinabove. The control circuit 128 comprises a control switch 224, such as a bipolar NPN transistor, coupled to the MOSFET 200 for controlling the state of the MOSFET in response to the voltage on the thermistor line 212. When the battery is coupled to the charger, a voltage is apparent on the thermistor line 212 as a result of the voltage divider formed by the thermistor in the battery and the thermistor pull-up resistor in the charger. This voltage is typically in the range of about 1.5 volts to 4 volts. The control switch transistor 224 is connected across the thermistor through base resistor 226. The base resistor is selected so that sufficient bias current can be provided to the control switch transistor without significantly affecting the measurement of battery temperature. For example, if the thermistor has a nominal resistance of 10K Ohms at 25° Celsius, then a base resistance of more than about 100K Ohms would not significantly interfere with temperature measurements. However, enough current is provided to cause the control switch to change to a low impedance. This in turn pulls down the gate voltage of the MOSFET 200, which, prior to coupling the battery to the charger, is held high by a pull-up resistor 228. When the gate voltage gets pulled low, the MOSFET changes from a high impedance state to a very low impedance state.

To disable the high rate protection circuit, the charger asserts a control signal on control line 222, causing the disable switch to change to a low impedance state and pulling the thermistor line to a low voltage level. This effectively removes bias voltage from the control switch transistor 224, causing the MOSFET to change to a high impedance state. However, due to the intrinsic diode 202, current can still pass through the high rate protection circuit, but there will be a significantly higher voltage drop across the high rate protection circuit than when the MOSFET is in a low impedance state.

In practicing the novel method, then, the charger must first apply a test current to the battery, measure the battery voltage with and without the control signal that would disable the high rate protection circuit asserted, and compare the two voltage values. If they are substantially the same, it is inferred that the battery does not include the high rate protection circuit, and the battery is charged at the standard rate. When the high rate protection circuit is disabled the battery voltage will be higher. If it is sufficiently higher, then it is inferred that the battery does include the high rate protection switch, and commences charging at an ultrafast rate after re-enabling the high rate protection circuit.

Figure 3:
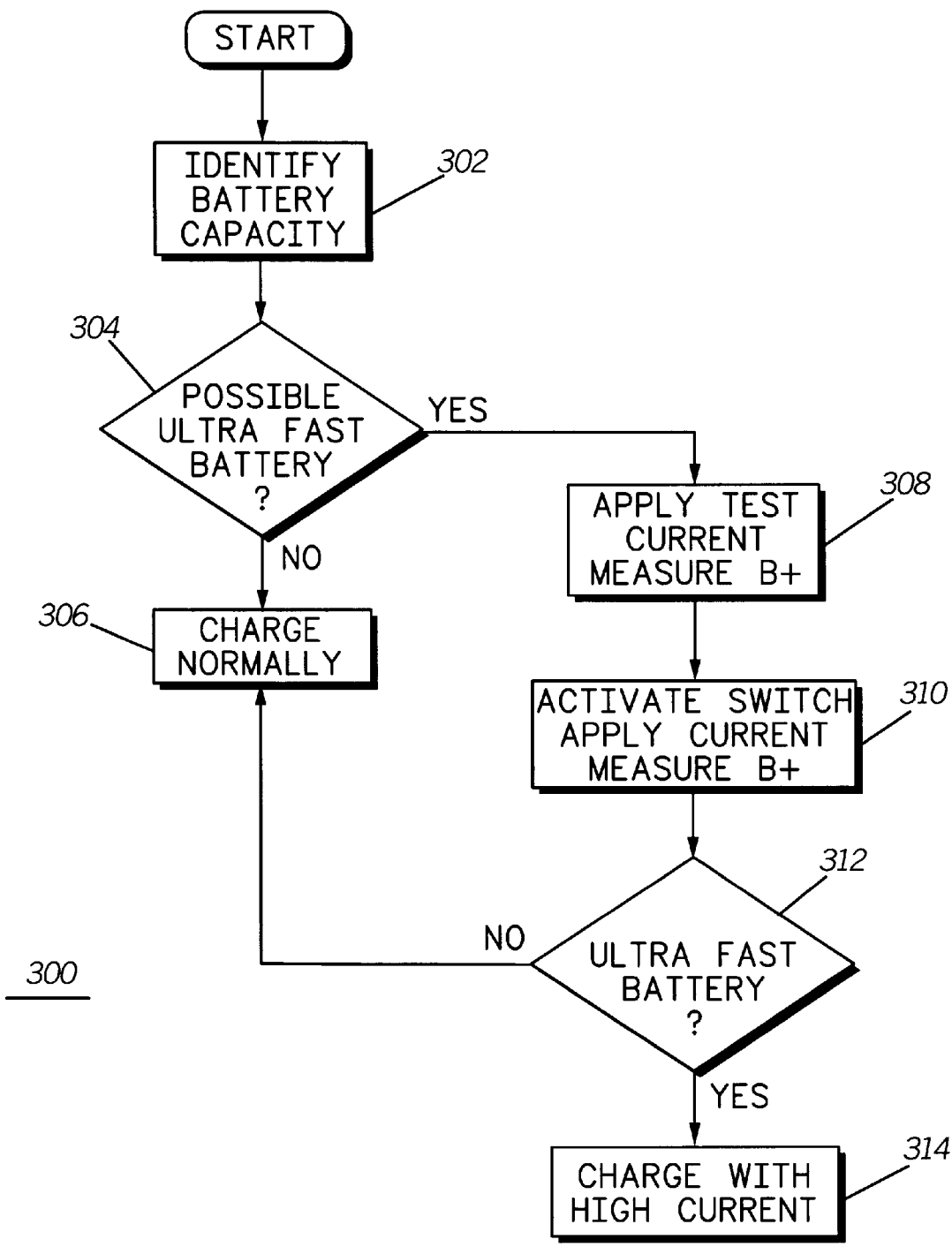
FIG. 3 is a flow chart diagram illustrating a method in accordance with the invention.

Referring now to FIG. 3, there is shown a flow chart diagram 300 in accordance with the preferred embodiment of the instant method invention. As indicated in block 302, a first step is identifying the battery capacity or classification, if multiple classifications exist. The next step, as indicated by block 304, is determining if the battery is of the type that could be an ultrafast rate capable battery. If not, then the charger proceeds to block 306 where the standard charge current is applied to the battery. If the battery is identified as one that may be an ultrafast rate capable battery, then, as indicated in block 308, the next step is applying a test current to the battery, then measuring a first battery voltage. This measurement is stored by the charger for later comparison. In the next block 310, the disable switch is activated by asserting a control signal, thereby disabling the high rate protection switch, if present in the battery, and a second battery voltage is measured and stored. In other words, the charger attempts to disable a high rate protection circuit in the battery by asserting a control signal to the battery. In the preferred embodiment, this is done by pulling the thermistor line to a low voltage level, but numerous other means may be used to actuate a circuit in the battery and are known in the art. After obtaining both measurements, the charger compares the first battery voltage with the second battery voltage and decides if the battery is ultrafast rate capable or not, as indicated by block 312, according to the criteria described hereinabove. If the not, then the charger proceeds to block 306 and applies the standard charge rate. If there is a sufficient difference between the measurements, then the charger proceeds to block 314 and applies an ultrafast rate charge scheme to the battery. In other words, the charger commences charging the battery at a first rate if the first battery voltage and second battery voltage are substantially similar, or at a second rate if the first battery voltage and second battery voltage are substantially different. In general, the observed difference will be about equal to the forward bias voltage of a diode, i.e. about 0.7 volts, if the high rate protection circuit is present. Prior to charging the battery, the charger deasserts the control signal in both blocks 306 and 314 so that if a high rate protection circuit is present, it will be re-enabled during charging.

This method allows the charger to distinguish between a standard battery and an ultrafast battery, and selecting the appropriate charge scheme. It is particularly useful when both types are available, such as when an ultrafast battery is introduced and marketed in an existing market where standard batteries already exist. The method makes use of the fact that the battery voltage will be different in an ultrafast battery if it's high rate protection circuit is disabled, compared to the battery voltage when the high rate protection circuit is enabled.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, it is contemplated that with a given product, only two batteries are made available; a standard version and an ultrafast version. In such a scenario, there may not be a code resistor present in the battery. However, the instant method invention allows a charger to distinguish between the two versions, and select the appropriate charge scheme. Likewise, it is not necessary that the high rate protection circuit be controlled over a thermistor line. It will be obvious to those skilled in the art that other means of controlling the high rate protection circuit are available.

What is claimed is:

1. A method of charging a battery, the battery having a high rate protection circuit, the method comprising the steps of:

applying a test current to the battery;

measuring a first battery voltage;

disabling the high rate protection circuit;

measuring a second battery voltage while the high rate protection switch is disabled;

re-enabling the high rate protection switch; and charging the battery at an ultrafast rate if the second battery voltage is sufficiently higher than the first battery voltage.

2. A method of charging a battery as defined in claim 1, further comprising the step of identifying a battery classification.

3. A method of charging a battery as defined in claim 2, wherein the step of identifying comprises reading a code resistor voltage of the battery.

4. A method of charging a battery as defined in claim 1, wherein the steps of disabling and re-enabling comprise adjusting a thermistor voltage.

5. A method of distinguishing a standard battery from an ultrafast battery, the method comprising the steps of:

coupling a battery to a charger;

applying a test current to the battery from the charger;

measuring a first battery voltage;

asserting a control signal to attempt to disable a high rate protection circuit;

measuring a second battery voltage while performing the step of asserting;

de-asserting the control signal; and charging the battery at an ultrafast rate if the second battery voltage is sufficiently higher than the first battery voltage.

6. A method of distinguishing a battery as defined in claim 5, wherein the step of identifying comprises reading a code resistor voltage of the battery.

7. A method of distinguishing a battery as defined in claim 5, wherein the steps of disabling and re-enabling comprise adjusting a thermistor voltage.

8. A method of distinguishing a standard battery from an ultrafast battery, comprising the steps of:

coupling a battery to a battery charger;

measuring a first battery voltage;

measuring a second battery voltage while attempting to disable a high rate protection circuit; and charging the battery at a first rate if the first battery voltage and second battery voltage are substantially similar or at a second rate if the first battery voltage and second battery voltage are substantially different.

9. A method of distinguishing as defined in claim 8, further comprising the step of identifying a battery classification, performed after the step of coupling.

10. A method of distinguishing as defined by claim 9, wherein the step of identifying comprises reading a code resistor value.

* * * * *